Masaaki Sato,
INVENTOR.
BY Wenderoth, Lind
And Ponack, Attorneys

Masaaki Sato,
INVENTOR.

BY Wenderoth, Lind and Ponack, Attorneys

Masaaki Sato,
INVENTOR.
BY Wenderoth, Lind and Ponack, Attorneys

MASAAKI SATO,
INVENTOR

BY Wenderoth, Lind & Ponack ATTORNEYS

MASAAKI SATO.
INVENTOR

BY Wenderoth, Lind + Ponack
ATTORNEYS

United States Patent Office 3,521,010

Patented July 21, 1970

3,521,010

ULTRAMINIATURE TAPE RECORDER WITH COMPONENTS DETACHABLE FROM THE MAIN BODY

Masaaki Sato, Tokyo, Japan, assignor to Olympus Optical Co., Ltd., Tokyo, Japan, a Japanese corporate body Continuation-in-part of application Ser. No. 604,822, Dec. 27, 1966. This application Feb. 5, 1969, Ser. No. 796,858

Claims priority, application Japan, Dec. 28, 1965, 41/80,562; Mar. 14, 1966, 41/15,494; Feb. 13, 1968, 43/9,814

Int. Cl. G11b *1/00, 5/00*

U.S. Cl. 179—100.2 12 Claims

ABSTRACT OF THE DISCLOSURE

An ultraminiature tape recorder in which components other than the tape driving mechanism, amplifier and sound recording and reproducing heads are contained in separate casings each having the same cross-sectional configuration transverse to at least one axis thereof as the cross-sectional configuration transverse to one axis of the main body. The further components can thus be attached to the main body in various permutations and combinations so as to provide an electric source, a speaker, a level meter and the like when desired.

During a sound reproducing operation, while the electrical connection is established between the main body containing the tape driving mechanism, amplifier and sound recording and reproducing heads and the casing containing the speaker when the latter casing is attached to the main body, the electrical connection is automatically switched to connect the microphone jack of the main body to the output of the main body during the reproducing operation when the speaker casing is eliminated, thereby permitting the sound reproduction to be effected without the speaker casing by connecting a magnetic microphone or the like.

CROSS-REFERENCE TO THE RELATED APPLICATION

This application is a continuation-in-part application of U.S. patent application Ser. No. 604,822 filed on Dec. 27, 1966 now abandoned by the same inventor as that of this application and assigned to Olympus Optical Co., Ltd.), in which convention priority was claimed based on Japanese patent application No. 40/80,562 filed on Dec. 28, 1965 and Japanese patent application No. 41/15,494 filed on Mar. 14, 1966.

The above original patent application Ser. No. 604,822 discloses an ultraminiature tape recorder wherein each of the components other than the tape driving mechanism, amplifier and sound recording and reproducing heads are housed in a respective separate casing attachable to the main body containing the tape driving mechanism, amplifier and sound recording and reproducing heads in various permutations and combinations so as to provide an electric source, a speaker, a level meter and the like when desired, thus permitting the tape recorder to be used each time in the minimum size by combining only the necessary elements for the desired operation.

This application includes an improvement in the above described ultraminiature tape recorder.

The improvement is the provision of means so that, while the electrical connection between the main body and the speaker casing is established when they are operatively combined for a reproducing operation, the electrical connection is automatically switched to connect the microphone jack of the main body to the output of the main body for a reproducing operation when the speaker casing is not attached to the main body, thereby permitting a magnetic microphone or small size speaker microphone to be operated in the reproducing operation by connecting the same to the microphone jack so that the reproducing operation is effected without the speaker casing although the volume to be reproduced is lowered to a certain degree thereby enabling the tape recorder to be used in the minimum size.

BACKGROUND OF THE INVENTION

The present invention relates to an ultraminiature tape recorder, and more particularly to an ultraminiature tape recorder of the type in which attachments such as a level meter, speaker, etc. and an electric source are separate from the main body of the tape recorder and such attachments can be freely attached to and detached from the main body.

The prior art tape recorder generally incorporates attachments such as speaker, level meter, etc. and the electric source in the main body. However, in the case of an ultraminiature tape recorder intended to be carried in a suit pocket, the volume of all such attachments plus the electric source is relatively great in comparison with the volume of the main body of the tape recorder, and so, as long as such attachments are incorporated in the main body it is impossible to construct a truly miniature tape recorder.

For example, the speaker is usually built into the main body of a tape recorder, although it is not used in recording or, even, where an ear phone suffices for reproduction, in reproducing sound. Also, the level meter is usually built into the main body, although it is not used in reproducing sound or, even, when the recording is repeated in the same manner in recording the sound.

The prior art tape recorder also incorporates the electric source in the main body, and in order to reduce the size of the tape recorder, a miniature electric cell such as a silver cell is used as the electric source. However, because such a silver cell has low capacity and is expensive, it is usually preferable to use the far more economical alkali cell or manganese cell. Such cells, however, cannot be built into the casing of the electric source housed in the main body. Alternatively, if an alkali or manganese cell is used by connecting it to the main body from outside, it is very inconvenient to use such a cell for a portable tape recorder, and, since the casing is not utilized, the amount of dead space in the main body is great. When the relationship between economy and the size of various cells is considered numerically, a silver cell is about 1/30 the size, about 1/35 the electric capacity and about 5 times the price in comparison with UM-3 cell. The alkali cell falls in between the above two cells.

In the prior art tape recorder, in which the speaker is contained in a separate casing and the sound reproduction is effected by attaching the speaker casing to the main body, the size of the tape recorder is necessarily great for a reproducing operation by virtue of the attachment of the speaker casing to the main body, thereby making the use of the tape recorder inconvenient.

SUMMARY OF THE INVENTION

An object of the present invention is, therefore, to eliminate the above mentioned disadvantages of the prior art. The present invention provides a novel and useful ultraminiature tape recorder in which attachments such as the speaker, level meter, etc. and the electric cell are each housed in a separate casing having the same cross-sectional configuration as that of the main body, each of such casings being capable of being selectively connected to the main body as desired.

Another object of the present invention is to provide a novel and useful ultraminiature tape recorder having the speaker contained in a separate casing in which the electrical connection for the sound reproduction is automatically switched to connect the microphone jack to the output of the main body when the speaker casing is not attached to the main body in the reproducing operation, thereby permitting the sound reproduction to be effected by a magnetic microphone or a small size speaker microphone by connecting the same to the microphone jack, so that the sound reproduction can be effected in with the minimum size of the tape recorder by virtue of the removal of the speaker casing from the main body.

The other objects and advantages of the present invention will be made clear by reading the following description of the various embodiments of the present invention in connection with the accompanying drawings illustrating the preferred embodiments of the invention.

DETAILED DESCRIPTION OF THE PREFERRED EMBODIMENTS

Figure 1:
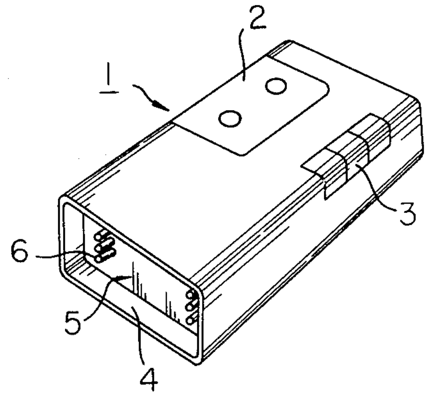
FIG. 1 is a perspective view of the main body of the tape recorder of the present invention.

Referring to the drawings, particularly to FIG. 1, there is shown main body 1, tape cartridge 2 incorporated in the main body 1 and operating means 3 for actuating the tape recorder. Engaging recess 5 surrounded by circumferential wall 4 is provided at one end of main body 1. Contact pins 6 of the connector are secured in said recess 5. The number of said contact pins 6 is determined by the requirement for connecting the respective casings of the attachments and the casing of the electric source to said main body 1 as hereinbelow described. It is apparent that driving means, amplifier means, recording and reproducing heads, etc. are built into the main body 1.

Figure 2A:
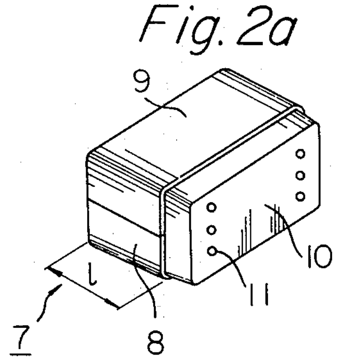
FIGS. 2*a* and 2*b* are perspective views of attachments attachable to the main body of the tape recorder, FIG. 2*a* showing the casing for the electric source, FIG. 2*b* showing the casing for the speaker.
Figure 2B:
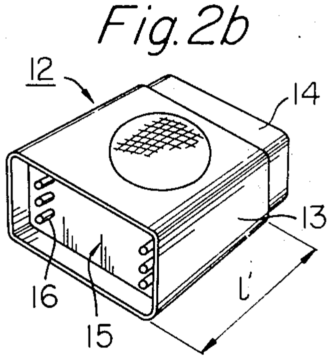

In FIGS. 2*a* and 2*b*, attachments adapted to be connected to main body 1 are shown in perspective, respectively. Casing 7 for the electric source is shown in FIG. 2*a*, while FIG. 2*b* shows casing 12 for the speaker.

Casing 7 for the electric source comprises a casing having the same cross-sectional configuration as that of main body 1, cover member 9 being detachably fixed to base member 8 to permit exchanging a battery therein. Engaging raised portion 10 is provided at one side of casing 7 which is adapted to engage in engaging recess 5 of main body 1. Contact holes 11 are provided in said engaging raised portion 10 which are adapted to receive contact pins 6 of the connector provided in said recess 5 of main body 1.

Casing 12 for the speaker likewise comprises a casing having the same cross-sectional configuration as that of main body 1, engaging raised portion 14 and contact holes (not shown) having the same size and configuration as that of casing 7 of the electric source being provided at one end surface of outer shell 13 of casing 12. Engaging recess 15 and contact pins 16 provided therein which have the same size and configuration as those provided in main body 1 are provided on the other end surface of said shell 13.

Other attachments such as a level meter, for example, are formed so that the both end portions thereof have the same size and configuration as those shown in FIG. 2*b*. Each of said attachments is housed in a casing having length *l'* selected to have the desired value for said attachment. In an electric cell having a different size is used as the electric source, the casing for such cell is changed to have length *l* to accommodate such cell.

Figure 3A:
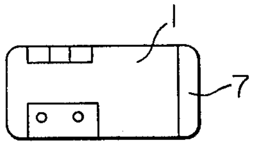
FIG. 3*a* is a plan view of the tape recorder constructed with the minimum size in which the electric source is connected to the main body of the tape recorder.
Figure 3B:
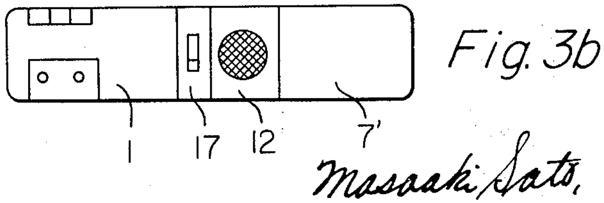
FIG. 3*b* is a plan view of the tape recorder in which the casings of attachments such as the level meter, speaker, etc. and the casing of the electric source are combined with the main body of the tape recorder.

FIGS. 3*a* and 3*b* show the embodiments of the invention in which casing 7 for the electric source and the casings for attachments such as a speaker, etc. are suitably connected to main body 1 of the tape recorder in order to complete the combination, respectively, FIG. 3*a* showing the connection of casing 7 for a silver cell to main body 1 so that the size of the combination is minimized for the operation of recording on the tape. In this case, an ear phone is used for listening to the reproduced sound. FIG. 3*b* shows the example of the combination in which casing 17 of the level meter, casing 12 of the speaker and casing 7' of a manganese cell are connected in series to main body 1 of the tape recorder. FIGS. 3*a* and 3*b* show the basic and most economical combination of the elements required for desired operation, respectively.

In the tape recorder as shown in FIG. 3*b*, when a series of the attachments are successively attached to the main body of the tape recorder, the play between each of the connecting portions is integrated and a substantial degree of play will be effected between the opposite ends of the combination thus giving the user an unpleasant feeling. Further, such substantial play will cause the electric contacts in the circuit to be worn or will cause noise in operation, and will cause accidental disconnection of the combination making the tape recorder unusable.

In order to avoid the above defects, the play between the connecting portions must be minimized and the strength of the connecting portions must be made greater.

Figure 4A:
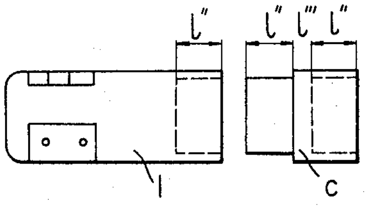
FIG. 4*a* is a side view showing the manner in which the main body of the tape recorder and the attachment are connected by using elongated engaging means.
Figure 4B:
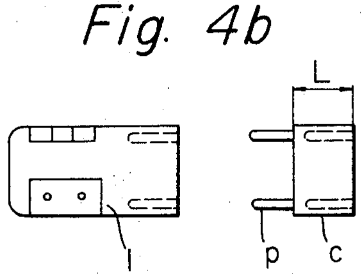
FIG. 4*b* is a side view showing the manner in which the main body of the tape recorder and the attachment are connected by using engaging means in the form of a pin-and-hole connection.

In order to achieve the above, a first solution is to make the length of engagement of the connecting portions greater as shown in FIG. 4*a*. However, the opening for the indicator portion in casing 17 of the level meter or the opening in casing 12 of the speaker shown in FIG. 3*b* must be located within the length *l'''* of the portion designated in FIG. 4*a*, because the length *l''* thereof is used for connecting the other element and cannot be used for providing the opening therein, and the raised portion having the length *l''* must be provided for connecting the casing to other element, thereby requiring an increase in the total length of the casing, while the space occupied by length *l''* in the main body cannot be utilized to house any parts of the tape recorder. Therefore, there is a substantial increase in the dead space for each element of the tape recorder if the length of each of the connecting portions of each element is made greater. On the other hand, the tape recorder, in which engaging pins P and the corresponding engaging holes are provided for connecting the elements of the tape recorder as shown in FIG. 4*b*, requires an excess length L of casing 1 as shown in that figure for providing the corresponding holes for receiving engaging pins of the other element, hence resulting in an increase in the dead space in each element of the tape recorder. Further, such pins are inconvenient and dangerous when the tape recorder elements are to be carried in the pocket of a man's suit.

FIGS. 5*a*–5*e* show one embodiment of the connecting means in accordance with the present invention to avoid the above disadvantages.

Figure 5A:
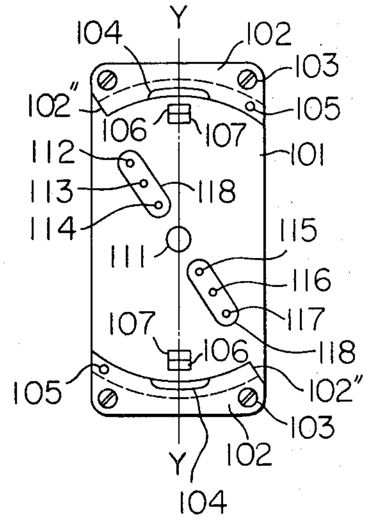
FIG. 5*a* is a plan view showing the construction of the connecting means on the side of the main body of the tape recorder in accordance with another embodiment of the present invention.
Figure 5B:
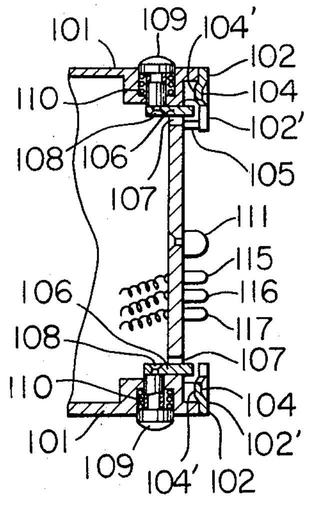
FIG. 5*b* is a cross-sectional view along line Y—Y of FIG. 5*a*.

FIGS. 5*a* and 5*b* show the connecting portion of the main body of the ultraminiature tape recorder of the invention, in which main body 101, a pair of female engaging plates 102 each having a recessed portion 104 are shown, said plates 102 being fixedly secured to the end surface of said main body 101 at opposite sides thereof by means of machine screws, 103. Groove 122 of male engaging plate 120 shown in FIG. 5*d*, which is provided on the element to be connected to the main body, is adapted to engage with inner face 104' of said recessed portion 104 of engaging plate 102 and with outer face 102' of engaging plate 102, said recessed portion 104 affording strong spring action for engaging said groove with said faces. Of course, recessed portion 104 can be replaced by a plate spring attached at its one end to said engaging plate 102. A pin 105 secured to both main body 101 and female engaging plate 102 at a position adjacent to one end of said engaging plate 102 serves as a stop for positioning male engaging plate 120 of the element to be connected to the main body when they are connected. Clamping pawl 106 for clamping said male engaging plate 120 in position extends through square hole 107 in main body 101 and is fixedly secured to shaft 108 and is normally urged radially outward by means of spring 110 located between main body 101 and clamp release button 109. Said square hole 107 serves to limit the range of movement of said clamping pawl 106 and also serves to prevent said pawl 106 from rotating about the axis of said shaft 108. Pivot shaft 111 is fixedly secured to the end surface of said main body 101 at the center thereof and serves to position and engage main body 101 with the element to be connected thereto with said engaging plates 102 and 120 being engaged and relatively rotated about said pivot axis. It is clear from the drawings, that cutout portion 121 in engaging plate 120 snugly receives pawl 106 when main body 101 is connected to the engaging element in the correct position. Contact pins 112–117 are fixedly secured to insulating member 118 fixed to main body 101 and provide electric connector means to electrically connect the main body to the attachment connected thereto.

Figure 5C:
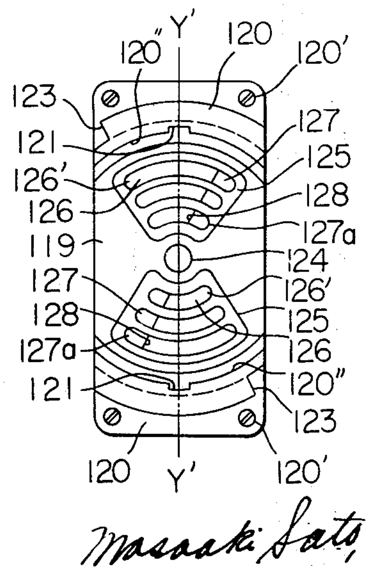
FIG. 5*c* is a plan view showing the construction of the connecting means of the attachment adapted to be connetced to the connecting means on the side of the main body of the tape recorder shown in FIGS. 5*a* and 5*b*.
Figure 5D:
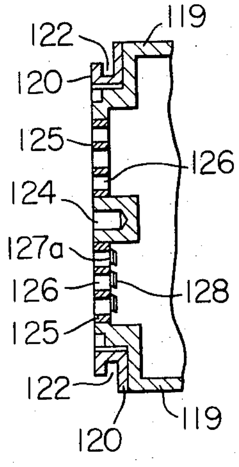
FIG. 5*d* is a cross-sectional view along line Y'—Y' of FIG. 5*c*.

FIGS. 5*c* and 5*d* show the connecting portion of the attachment to be connected to main body 101 shown in FIGS. 5*a* and 5*b*, FIGS. 5*c* and 5*d* showing casing 119 of the attachment, male engaging plate 120 being fixedly secured to the end surface of said casing 119 by means of machine screws 120', said engaging plate 120 having groove 122 in which said female engaging plate 102 is engaged with faces 102' and 104' in contact with the sides of said groove 122. Engaging plate 120 is further provided with abutment face 123 at one end thereof which abuts against stopper 105 shown in FIG. 5*a* when main body 101 is connected to the attachment and located in position. Pivot shaft bearing 124 fixedly secured to casing 119 serves as a bearing for said pivot shaft 111 shown in FIGS. 5*a* and 5*b*. A plurality of arc shaped elongated holes 126 located concentrically about the axis of said bearing 124 are provided in insulating plate 125 which is fixedly secured to said casing 119, the number of said elongated holes 126 and the distances between the respective holes and the axis of the bearing corresponding to those of said contact pins 112–117. Said elongated holes 126 have sufficient clearances between them and the respective contact pins 112–117 when said pivot shaft 111 in main body 101 is engaged with said pivot shaft bearing 124 of the attachment and relatively rotated, so that said pins 112–117 do not contact with the end surface of said casing 119 of the attachment. A plurality of plate springs 127 are provided on the inner face of said insulating plate 125 with one of their ends secured to said insulating plate 125. Free end **127*a* of each of said plate springs 127 is provided with end portion 128 which is bent so as to be spaced from said insulating plate 125**.

Figure 5E:
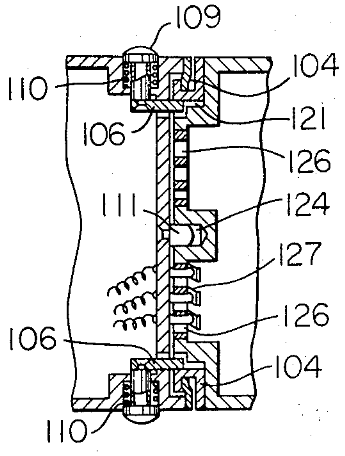
FIG. 5*e* is a cros sectional view showing the manner in which the connecting means on the main body is connected to the connecting means of the attachment shown in FIGS. 5*a*–5*d*.
Figure 6:
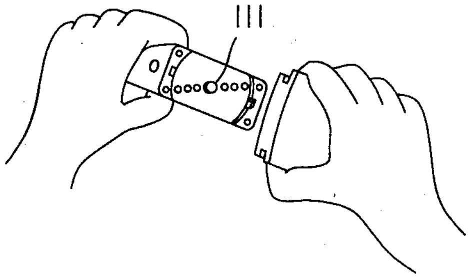
FIG. 6 is a perspective view showing how the main body of the tape recorder in accordance with the present invention is connected to the attachment.
Figure 7A:
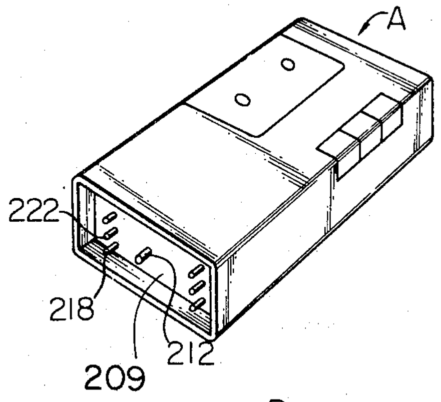
FIGS. 7*a*–7*c* are views showing the manner how the connection is made between the main body, the speaker casing and the electric source casing of a further embodiment of the present invention.
Figures 7B, 7C:
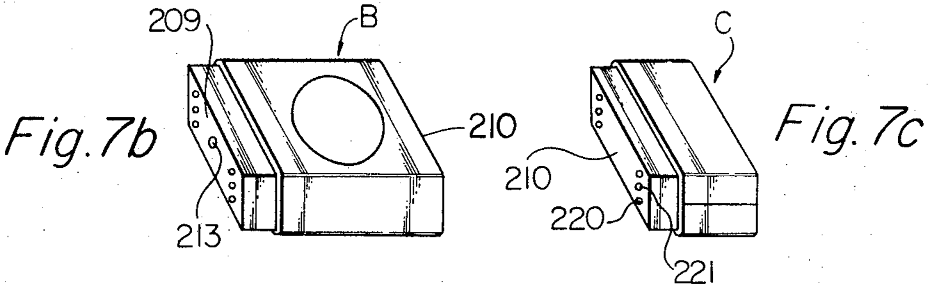
Figure 8A:
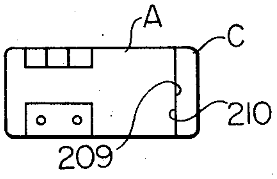
FIG. 8*a* is a view showing the connection of the tape recorder of FIG. 7 in which the speaker casing is eliminated.
Figure 8B:
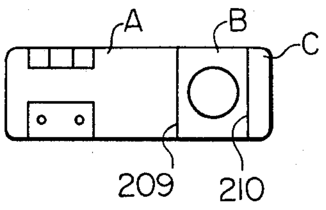
FIG. 8*b* is a view similar to FIG. 8*a* except that the speaker casing is included in the combination.
Figure 9A:
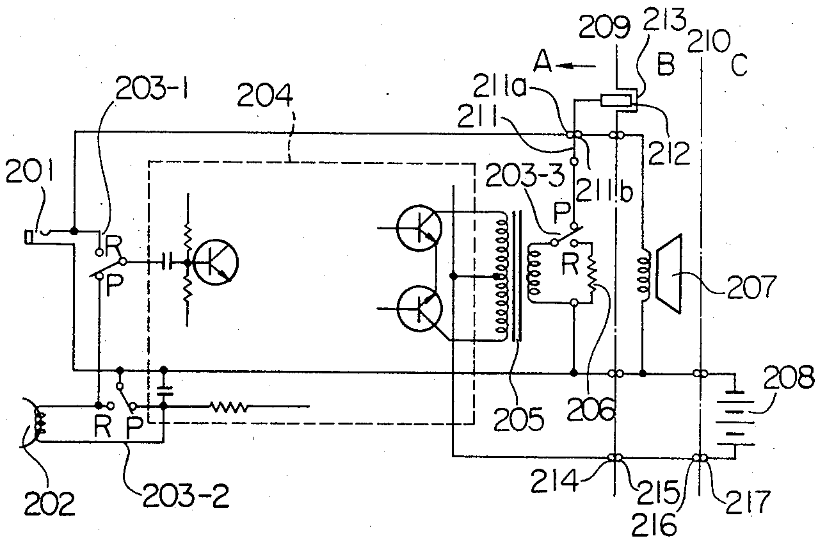
FIG. 9*a* is a diagram showing the electric circuit employed in the tape recorder of FIG. 7 with the details of the amplifier being omitted.
Figure 9B:
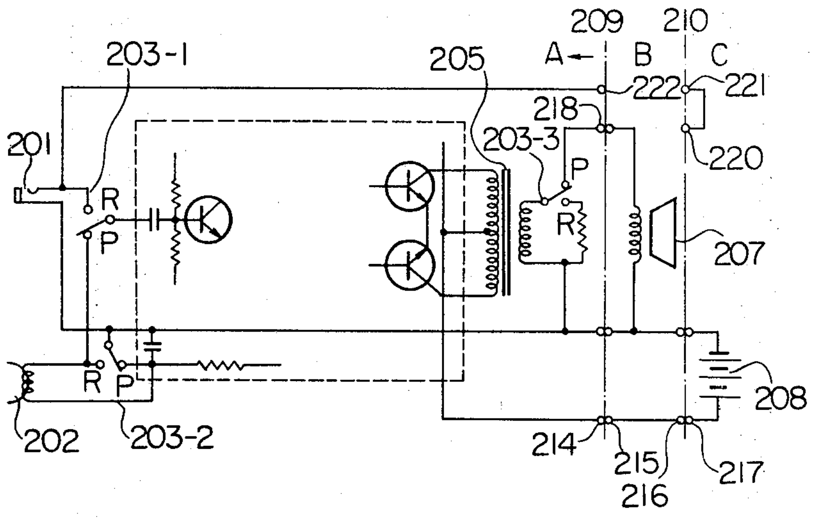
FIG. 9*b* is a diagram showing a modification of FIG. 9*a*.

In connecting the main body to the attachment, the main body is grasped in the left hand, for example, as shown in FIG. 6, and the attachment is held in the right hand, and the end surface of the main body is brought into contact with the end surface of the attachment with a vertical plane through the longitudinal axis of the main body being inclined about 90° with respect to the corresponding plane of the attachment, thereby engaging first pivot shaft 111 with pivot shaft bearing 124. Thereafter the attachment is rotated in the clockwise direction relative to the main body until the rotation is stopped by abutting of abutment face 123 against stopper pin 105 while the main body is slightly pressed against the attachment. FIG. 5*e* shows the condition in which the connection of the main body and the attachment is completed. By engaging pivot shaft 111 with bearing 124 as shown in FIG. 6, contact pins 112–117 are inserted into said elongated holes 126 at the one ends 126', respectively (see FIG. 5*c*). When the main body is rotated relative to the attachment, one end 102'' (FIG. 5*a*) of female engaging plate 102 is engaged within groove 122 at one end 123 (FIG. 5*c*) of male engaging plate 120. Further rotation causes male engaging plate 120 to come to said recessed portion 104 of said female engaging plate 102 thereby affording tight engagement of both engaging plates 102 and 120 without any play left therebetween, and finally abutment face 123 abuts against stopper pin 105 (FIG. 5*a*) whereby proper positioning of the main body and the attachment is obtained. At the same time, clamping claw 106, which has been moved radially inwardly by means of inner side edge 120'' (FIG. 5*c*) of male engaging plate 120 against the action of spring 110, falls into cutout portion 121 of male engaging plate 120 thereby positively clamping the attachment in position. Contact pins 112–117 engage the free ends **127*a* of plate springs 127** against the spring action thereof, respectively, thereby affording intimate contact between the contact pins and the springs so that the electric connecion between the main body and the attachment is completed.

In order to disengage the connection between the main body and the attachment, it is only necessary to depress release button 109 against the action of spring 110 so as to disengage claw 106 from cutout portion 121 and to rotate the main body in the reverse direction to that for connection of the main body to the attachment.

In the embodiment shown, female engaging plate is provided on the main body as shown in FIGS. 5*a* and 5*b*, while male engaging plate is provided on the attachment as shown in FIGS. 5*c* and 5*d*. However, the male engaging plate may be provided on the main body while the female engaging plate is provided on the attachment.

It is apparent that an attachment such as a level meter 17, or speaker 12, which is adapted to be connected between other elements must be provided with male and female engaging plates at respective opposite ends thereof.

The two clamping mechanisms are provided in the embodiment shown; however, it is sufficient to provide only one clamping mechanism, though it is preferable to provide two clamping mechanisms in order to assure safety.

Further, in FIGS. *5a* and *5c*, when the arrangement of contact pins and corresponding elongated holes is symmetrical with respect to the axis of rotation about pivot shaft or pivot shaft bearing, there might be a danger that the main body of the tape recorder is connected to the attachment in reverse position, thus resulting in erroneous electric connection between the main body and the attachment. In order to avoid such an erroneous connection, the arrangement of the upper set of contact pins and corresponding elongated holes is preferably made unsymmetrical to the lower set of pins with respect to the axis of rotation. For example, the radial distances between the respective contact pins and elongated holes on the upper side of the main body or the attachment and the center are selected to be different from those on the lower side, or the diameters of the respective contact pins 112–114 are selected to be different from those of contact pins 115–117 together with a corresponding change in the width of the elongated holes thereby making the pins and holes at the upper side unsymmetrical relative to those at the lower side.

In the further embodiment of the present invention shown in FIGS. *7a–7c,* main body A is provided with a switch button 212 at the center of parting surface 209 at which main body A is connected to either the speaker casing B or the electric source casing C. As shown in the drawing, a hole 213 adapted to loosely receive switch button 212 without moving the same is provided in speaker casing B at the corresponding position in parting surface 209 of speaker casing B, whereas no such hole is provided in electric source casing C. As described later, when the switch button 212 is depressed, it switches the electrical connection to speaker casing B from the main body A during the sound reproducing operation so as to connect the microphone jack 201 provided in main body A to the sound reproduction output. Therefore, when speaker casing B is attached to main body A together with electric source casing C as shown in FIG. *8b,* the electrical connection between main body A and speaker casing B is established by virtue of the loose fitting of switch button 212 within hole 213 without causing the movement of switch button 212, so that the speaker in speaker casing B is operated during the sound reproducing operation. On the other hand, when electrical source casing C is directly attached to main body A without the interposition of speaker casing B as shown in FIG. *8a,* the electric connection leading to speaker casing B from the output of the main body A in the reproducing operation is switched so as to connect microphone jack 201 to the sound reproduction output during the sound reproducing operation, because switch button 212 is depressed by the attachment of electric source casing C to main body A, since no hole is provided in parting surface of electric source casing C for receiving switch button 212 without moving the same. Therefore, when a magnetic microphone or a small size speaker microphone is connected to microphone jack 201, the sound reproduction can be effected without speaker casing B during the reproducing operation of the tape recorder, thereby permitting the size of the tape recorder to be kept at the minimum during the sound reproducing operation.

FIG. *9a* shows the electric circuit utilized in the tape recorder shown in FIGS. *7a–7c,* wherein speaker casing B is attached to main body A together with electric source casing C.

As shown in FIG. *9a,* the circuit includes microphone jack 201, sound recording head 202, switches 203–1, 203–2 and 203–3 for switching the recording operation to the sound reproducing operation, R designating the contacts for the recording while P designates the contacts for the sound reproduction, an amplifier 204 shown encircled by a broken line with the internal details thereof being omitted, an output transformer 205, a load resistance 206 for use during a recording operation, the above elements being housed in main body A, the speaker 207 contained in speaker casing B, and a battery 208 or the like contained in electric source casing C. When switches 203–1, 203–2 and 203–3 are switched to contacts P, the tape recorder is actuated for sound reproduction, while it is actuated for recording, when the switches are switched to contacts R. Connectors 214, 215 and 216 serve to electrically connect elements in speaker casing B and/or elements in electric source casing C to the corresponding elements in main body A, respectively. Since the electric circuit of the type shown in FIG. *9a* is rather conventional, a detailed description will be unnecessary. In the electric circuit shown in FIG. *9a,* however, a switch arm 211 is movably located between contacts **211*a* and 211*b* and switch button 212 is secured to the free end of switch arm 211. The other end of switch arm 211 is connected to contact P of switch 203–3. Contact 211*a* leads to microphone jack 201 while contact 211*b* leads to one of connectors 214 adapted to be connected to the mating connector 215 in speaker casing B. Switch arm 211 normally contacts with contact 211*b* so that the electric connection leading to connector 214 from contact P is normally established. However, when switch button 212 is depressed, switch arm 211 is urged to contact with contact 211*a* so that electrical connection between microphone jack 201** and contact P is established. In the condition shown in FIG. *9a* in which switch button 212 is loosely received in hole 213 in speaker casing B, the electrical connection between main casing A and speaker casing B is established for the reproducing operation. However, when speaker casing B is omitted from the combination shown in FIG. *9a* and electric source casing C is directly attached to main body A, switch button 212 is depressed so that switch arm 211 contacts with contact **211*a* thereby connecting microphone jack 201 to contact P. Therefore, when the tape recorder is in condition for a sound reproducing operation, the output from transformer 205 is supplied to microphone jack 201 through contact P, thus permitting the sound reproduction to be effected without speaker casing B by connecting a magnetic microphone or the like to microphone jack 201**, although the volume of the reproduction is lowered to a certain degree in comparison with the case in which speaker casing B is used. This enables the sound reproduction to be effected while the size of the tape recorder is kept at the minimum by the omission of speaker casing B.

FIG. *9b* shows a modification of FIG. *9a*. This circuit includes connectors 218, 222 in main body A in place of switch arm 211 and contacts **211*a*, 211*b*** shown in FIG. *9a,* and contacts 220 and 221 in electric source casing C which are short circuited to each other. In this case, hole 213 as shown in FIG. *7b* is omitted from speaker casing B. With the circuit shown in FIG. *9b,* speaker casing B is electrically connected to main body A together with electric source casing C while microphone jack 201 is disconnected from contact P during the sound reproducing operation. However, when speaker casing B is omitted and electric source casing C is directly attached to main body A as shown in FIG. *8a,* then connector 218 is short circuited to connector 222 thereby permitting microphone jack 201 to be energized by the output of transformer 205 through contact P during the sound reproducing operation so that the reproduction can be effected without speaker casing B by connecting a magnetic microphone or a small size speaker microphone to microphone jack 201.

The above selective alteration of the electrical connection of the output of transformer 205 to the speaker casing or the microphone jack in the sound reproducing operation depending upon whether or not speaker casing B is included in the combination in the tape recorder can be applied to the tape recorder having the connecting mechanism as shown in FIGS. *5a* to *5e*. In this case, pivot shaft 111 shown in FIG. *5b* and pivot shaft bearing 124 shown in FIG. *5d* are replaced by switch button 212 shown in FIG. *7a* and hole 213 shown in FIG. *7b* or two of contact pins 112–117 as shown in FIG. *5a* and the corresponding spring plate contacts 127 as shown in FIG. *5c* are utilized as connectors 218, 222 and 220, 221 shown in FIG. *9b*.

It is apparent that the switching operation can be altered so that the microphone jack is normally connected to the output during the reproducing operation when the speaker casing is not attached to the main body, while the electric connection is switched to the speaker casing when the speaker casing is attached to the main body during sound reproducing operation.

As described hereinabove, the ultraminiature tape recorder in accordance with the present invention comprises attachments and the electric source which are respectively housed in a separate casing having the same cross-sectional configuration as that of the main body of the tape recorder, each casing of the attachment or the electric source being adapted to be connected to the end surface of the main body or the other attachment of the tape recorder. Therefore, the minimum number of elements required for desired operation of the tape recorder can be combined within the pocket of a man's suit when the tape recorder is carried in the pocket. Further, in accordance with the present invention, extremely thin engaging plates can be employed in the main body and the attachment so as to snugly connect the main body to the attachment, thereby greatly reducing the space required for providing connecting means on the main body and the attachment. In case the tape recorder in accordance with the present invention is used in a business office, for example, a sufficient number of attachments can be used so as to reproduce exact sound and a more economical electric cell can be used instead of the electric source described above. It is of course possible to make any combination in the tape recorder other than that described above depening on the operator's will. Since the cross-sectional configuration of the main body and the attachments are the same, only the length of the tape recorder is changed depending upon the number and kind of attachments connected to the main body, thereby affording convenient use and unity in design.

At the same time, in accordance with the present invention, selective alteration of the electrical connection of the output of the output transformer in the main body either to the speaker casing or to the microphone jack during the sound reproducing operation can be effected automatically depending upon whether or not the speaker casing is included in the combination of the tape recorder of the present invention, thereby permitting the sound reproduction to be effected without the speaker casing while the size of the tape recorder is kept at the minimum.

It should be understood that the present invention is not limited to the embodiments shown but includes all modifications and alterations within the scope of the present invention as defined in the appended claims.

I claim:

1. An ultraminiature tape recorder comprising: a main body having therein a driving mechanism for driving the tape to be operated in the tape recorder, an amplifier, and sound recording and reproducing heads for the tape coupled to the amplifier; and further components comprising at least an electric source, a speaker, and a level meter for completing the tape recorder, a separate casing for each of said further components, wherein the improvement comprises the fact that each separate casing has the same cross-sectional configuration transverse to at least one axis thereof as that transverse to one axis of said main body so as to constitute respectively attachments to said main body, at least one of the two end surfaces at the ends of said one axis of said main body and each of the two axial end surfaces of all but one of said attachments being provided with engaging means for detachably connecting said main body and said attachments to each other, thereby permitting said main body to be selectively connected to any of said attachments while any selected number of said attachments can be selectively connected in series to each other, so that the space required for the tape recorder for the desired operation thereof is reduced to the minimum.

2. An ultraminiature tape recorder as claimed in claim 1, wherein the cross-sectional configuration of the main body transverse to the longitudinal axis is made thin, so that the main body and the attachments can be held in a pocket of a man's suit.

3. An ultraminiature tape recorder as claimed in claim 1, wherein a pivot shaft is provided on one of the end surfaces of the main body at the center thereof and a pivot shaft bearing for rotatably receiving said pivot shaft is provided at the center of each of the end surfaces of the electric source and the component to be connected to said one of the end surfaces of the main body, male and female engaging plates being provided respectively on opposed mating end surfaces of the main body and the electric source and the component at the extremities of the end plates in a direction transverse to the said one axis of said main body so as to permit the rotative engagement of said male and female engaging plates about the axis of rotation defined by said pivot shaft and the bearing, contact pins being provided on one of the opposed mating surfaces of the main body and the electric source and the component while corresponding elongated holes for receiving said pins, respectively, are provided in the other of the opposed mating surfaces of the main body and the electric source and the component so as to permit the contact pins to be inserted in said elongated holes during the rotative engagement of the main body with the electrical source or the component so that the electrical connection is completed between the main body and the electric source or the component, and clamping pawl means cooperating with the female engaging plate for releasably holding the connection of the main body and the electric source or the component connected to the main body in set position.

4. An ultraminiature tape recorder as claimed in claim 3 wherein the component or the electric source, which is adapted to be connected between any two elements of the series of the connection of the tape recorder, is provided on the end remote from the main body with the same engaging means as that provided on the mating end surface of the main body.

5. An ultraminiature taper recorder as claimed in claim 1, wherein a pivot shaft bearing is provided on one of the end surfaces of the main body at the center thereof while a pivot shaft for rotatably engaging with said pivot shaft bearing is provided on each of the end surfaces of the electric source and the component to be connected to said one of the end surfaces of the main body at the center thereof, male and female engaging plates being provided respectively on opposed mating end surfaces of the main body and the electric source and the component at the extremities of the end plates in a direction transverse to the said one axis of said main body so as to permit the rotative engagement of said male and female engaging plates about the axis of rotation defined by said pivot shaft and the bearing, contact pins being provided on one of the opposed mating surfaces of the main body and the electric source and the component while corresponding elongated holes for receiving said pins, respectively, are provided in the other of the opposed mating surfaces of the main body and the electric source and the component so as to permit the contact pins to be inserted in said elongated holes during the rotative engagement of the main body with the electric source or the component so that the electrical connection is completed between the main body and the electric source or the component, and clamping pawl means cooperating with the female engaging plate for releasably holding the connection of the main body and the electric source or the component connected to the main body in set position.

6. An ultraminiature tape recorder as claimed in claim 5, wherein the component or the electric source, which is adapted to be connected between any two elements of the series of the connection of the tape recorder, is provided on the end remote from the main body with the same engaging means as that provided on the mating end surface of the main body.

7. An ultraminiature tape recorder comprising a main body having a tape driving mechanism, an amplifier and sound recording and reproducing heads therein said tape recorder having respective separate casings housing a speaker and further elements adatped to be selectively attached to said main body in various permutations and combinations so as to effect sound recording or reproduction as desired, said main body having a microphone jack and an electrical connection to said microphone jack, switching means for connecting said electrical connection to the output of said amplifier during the sound reproducing operation, said speaker casing having connection means thereon for connecting to said amplifier to supply the output of said amplifier to said speaker in said speaker casing and having means cooperating with said switching means so that said electrical connection and the output of said amplifier are disconnected when said speaker casing is attached to said main body, whereby sound reproduction can be effected without attaching said speaker casing to said main body by connecting a magnetic microphone or a speaker microphone or the like to said microphone jack during the reproduction operation.

8. An ultraminiature tape recorder as claimed in claim 7 wherein said switching means is normally closed, said speaker casing having a shape for engaging said switching means to open said switching means when said speaker casing is attached to said main body, whereby when said speaker casing is not attached to said main body, said amplifier output is connected to said microphone jack.

9. An ultraminiature tape recorder as claimed in claim 7 wherein said switching means is normally open, said speaker casing having a shape for remaining disengaged with said switching means when said speaker casing is attached to said main body, and said other separate casings have means thereon for engaging said switching means for connecting said switching means when they are attached to said main body.

10. An ultraminiature tape recorder as claimed in claim 9 wherein said switching means includes a switch button projecting out of said main body, and said speaker casing has a recess therein for loosely receiving said switch button without moving it when the speaker casing is attached to said main casing, whereby the speaker casing is supplied with output from the amplifier when it is attached to said main body, and said other separate casings have a wall portion engaging said switch button to switch the switching means to the connected condition when said other separate casings are attached to said main body, whereby the amplifier output is connected to said microphone jack.

11. An ultraminiature tape recorder comprising a main body having a tape driving mechanism, an amplifier and sound recording and reproducing heads therein, said tape recorder having respective separate casings housing a speaker and further elements adapted to be selectively attached to said main body in various permutations and combinations so as to effect sound recording or reproduction as desired, said main body having a microphone jack and an electrical connection to said microphone jack, said speaker casing having connection means thereon for connecting to said amplifier to supply the output of said amplifier to said speaker in said speaker casing and keeping said electrical connection and the output of said amplifier disconnected when said speaker casing is attached to said main body, and at least one of the other separate casings having means for establishing a connection between said electrical connection and said amplifier output, whereby sound reproduction can be effected without attaching said speaker casing to said main body by attaching said one of the other separate casings to the main body and connecting a magnetic microphone or a speaker microphone or the like to said microphone jack during the reproduction operation.

12. An ultraminiature tape recorder as claimed in claim 11 wherein said means in said other separate casing for establishing a connection comprises a short circuiting connection for connecting the electrical connection and the amplifier output.

References Cited

UNITED STATES PATENTS

| | | | |
|---|---|---|---|
| 3,351,887 | 11/1967 | Jones | 339—91 |
| 2,733,069 | 1/1956 | Frost | 274—4 |

BERNARD KONICK, Primary Examiner

J. ROSENBLAT, Assistant Examiner

U.S. Cl. X.R.

274—2